United States Patent [19]

Brant

[11] 4,269,419
[45] May 26, 1981

[54] FLUID PRESSURE SLEEVE AND RUBBER GASKET PIPE JOINT

[76] Inventor: Robert J. Brant, 29 College Park, Davis, Calif. 95616

[21] Appl. No.: 56,131

[22] Filed: Jul. 9, 1979

[51] Int. Cl.³ .............................................. F16J 15/46
[52] U.S. Cl. .................................. 277/34.3; 277/226
[58] Field of Search ............... 277/34.3, 226, 34, 34.6, 277/135, 207 A

[56] References Cited

U.S. PATENT DOCUMENTS

| | | | |
|---|---|---|---|
| 393,684 | 11/1888 | Berryhill | 277/34 X |
| 1,966,202 | 7/1934 | Pfefferle | 277/226 X |
| 2,226,304 | 12/1940 | Dillon | 277/226 X |
| 2,814,514 | 11/1957 | Beatty | 277/226 X |
| 3,121,570 | 2/1964 | Gilbert | 277/34.3 |
| 3,258,271 | 6/1966 | Hollingsworth | 277/34.3 X |
| 3,360,273 | 12/1967 | Hundt et al. | 277/34 |
| 3,501,868 | 3/1970 | Ganzinotti | 277/34.3 X |
| 3,980,311 | 9/1976 | Ditcher | 277/226 |
| 4,073,048 | 2/1978 | Ditcher | 277/34.3 X |
| 4,182,179 | 1/1980 | Meginnis | 277/226 X |

FOREIGN PATENT DOCUMENTS

| | | | |
|---|---|---|---|
| 743005 | 9/1966 | Canada | 277/34.3 |
| 537748 | 1/1956 | Italy | 277/34.3 |
| 494402 | 10/1938 | United Kingdom | 277/34.3 |
| 650641 | 2/1951 | United Kingdom | 277/34.3 |
| 730310 | 5/1955 | United Kingdom | 277/34.3 |

Primary Examiner—Robert S. Ward, Jr.
Attorney, Agent, or Firm—Blair, Brown & Kreten

[57] ABSTRACT

Disclosed herein is a sleeve which utilizes fluid pressure to form a seal between two cylindrical objects, typically a manhole wall and its associated conduit. The structure includes a ribbed annular sleeve provided with an inner chamber having valves disposed thereon to permit the introduction of a liquid which when introduced applies pressure on the seal and assures a tight fit. The seal is so constructed to act as a shock absorberand to counter act movement caused by vibration, deflection, or settlement, and a rubber gasket joint between vertical sections of manholes of variable heights, forms a water tight flexible seal, and is also used in joining concrete pipe approximately 18" through approximately 108" in all types of pressure conduits or gravity sewer lines.

6 Claims, 10 Drawing Figures

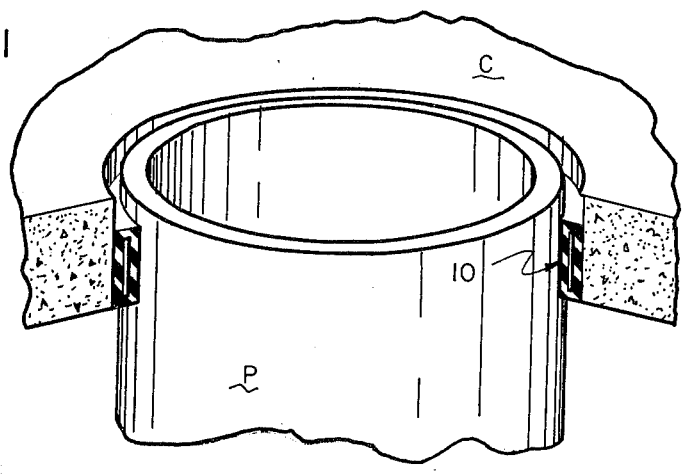
FIG. 1
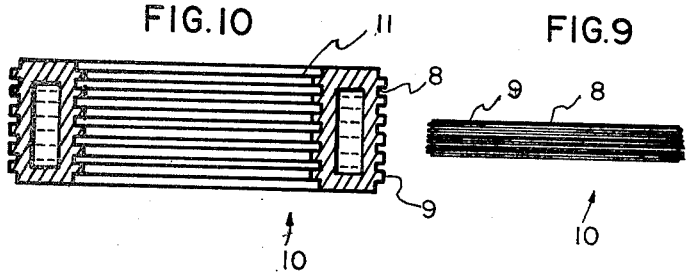
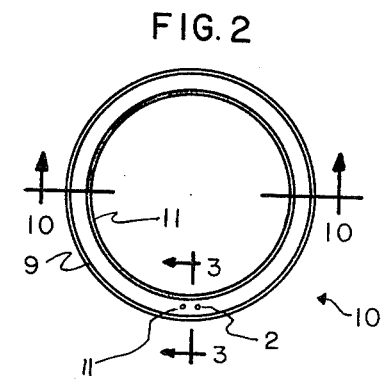
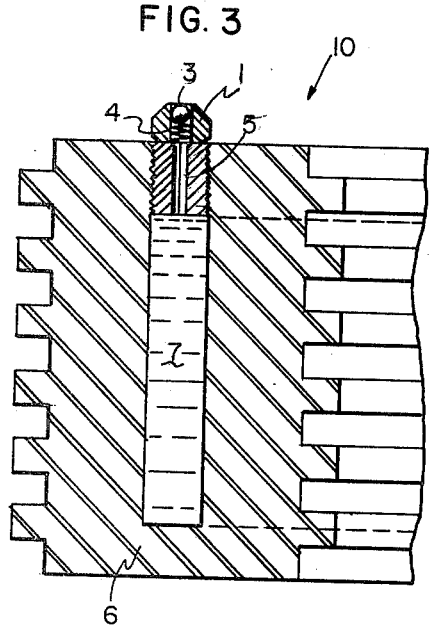
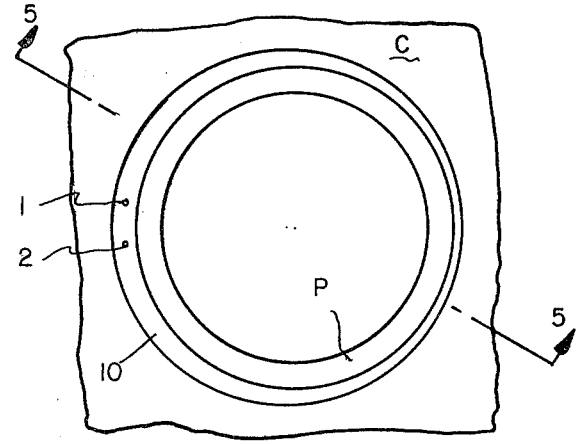
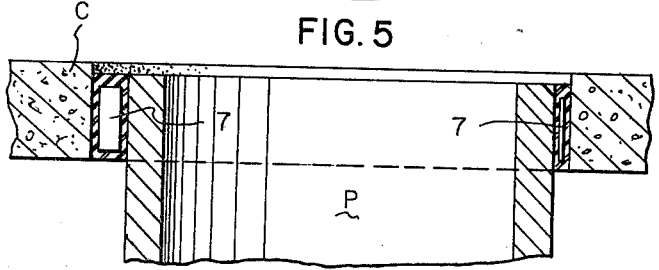

FLUID PRESSURE SLEEVE AND RUBBER GASKET PIPE JOINT

BACKGROUND OF THE INVENTION

Gaskets used in combination with pipe joints, and manhole shields have been known to exist in the prior art for some time. Those patents which reflect the prior art as the inventor is aware comprise the following:

| | |
|---|---|
| 393,684 Berryhill | 3,787,061 Yoakum |
| 2,226,304 Dillon | 3,787,078 Williams |
| 2,822,192 Beatty | 3,850,457 Bigotte et al |
| 3,142,234 Maloon | 4,009,545 Rossborough |
| 3,360,273 Hundt et al | 4,073,048 Ditcher |
| 3,759,280 Swanson | 4,102,088 Keller et al |

The patent to Hundt et al can be distinguished from the instant application by noting that this type of a gasket is typically used for a bell and spigot type pipe joint. The fluid in the instant application does not solidify or take a permanent set, and the unique structure associated with the instant application provides the ability to attenuate vibration, pump start or water hammer vibrations, as well as the natural shifting of one element relative to the other.

Similarly, Berryhill teaches the use of a joint seal for a bell and spigot arrangement wherein that specific structure is neither suitable for nor compatible with the use defined in the instant application.

The remaining references diverge even further from that which is taught in the instant application.

SUMMARY OF THE INVENTION

Briefly, the present invention affords benefits not contemplated by the prior art by teaching a structure which once installed provides a trouble free and reliable sleeve between a manhole and its surrounding base.

Further an object is to provide a sleeve of the character described above in which ribs are provided on the inner and outer annular faces of the sleeve which retard and resist displacement of the sleeve relative to its intended site.

Another object is to provide a sleeve of the character described above in which plural valve means are included to insure that the fluid inflated central portion thereof is free of air bubbles and therefore provides a uniform resistance to the deflections of the conduit relative to the base.

A further object contemplates providing a system of the character described above in which the pressure of the fluid can be set at a prescribed value so that different engineering considerations may be taken into account and flexibility for the system is provided.

To provide these objectives, the sleeve according to the present invention is preferably extruded from a continuous strip in the form of a heavy wall rubber envelop, cut to length with ends vulcanized together, forming a double wall band that fits snuggly over the pipe. The sleeve is expanded by puncturing an outer edge thereof and plural valve means are disposed so as to pump fluid therethrough. In this way, the sleeve and the size of the hole in the wall can be accurately matched so that a minimal amount of fluid is needed to pressurize and expand the walls.

These and other objects will be made manifest when considering the following detailed specification when taken in conjunction with the appended drawings.

BRIEF DESCRIPTION OF THE DRAWINGS

FIG. 1 is a perspective view showing the sleeve disposed in situ according to the present invention;

FIG. 2 is a perspective view of the sleeve removed from its environment;

FIG. 3 is a sectional view taken along lines 3—3 of FIG. 2;

FIG. 4 is a top plan view of the sleeve disposed in an environment in which the pipe is offset relative to the concrete structure surrounding it;

FIG. 5 is a sectional view taken along lines 5—5 of FIG. 4;

FIG. 9 is a side view of FIG. 2; and

FIG. 10 is a sectional view of FIG. 2.

DESCRIPTION OF THE PREFERRED EMBODIMENT

Figure 6:
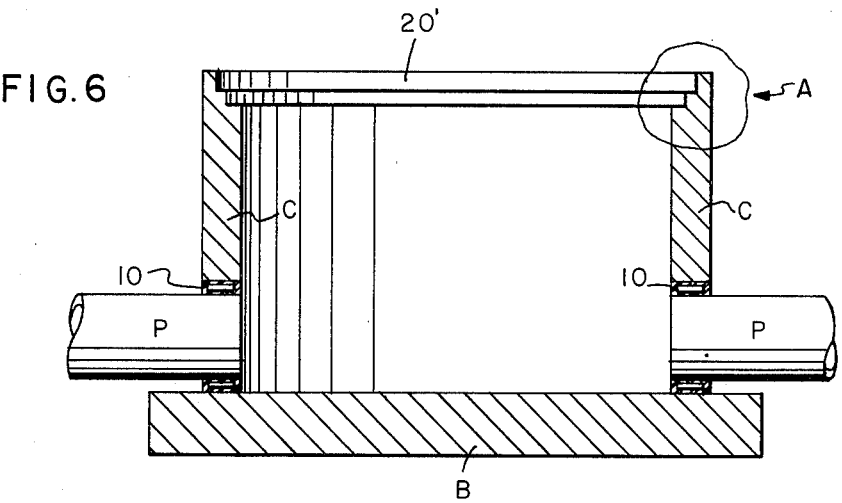
FIG. 6 is a sectional view showing the disposition of the sleeve in the preceeding drawings located in a different environment.

Referring to the drawings now, where like reference numerals refer to like parts throughout the several figures, reference numeral 10 is directed to a sleeve according to the present invention.

The sleeve 10 is generally comprised of heavy rubber formed with a double walled band construction that can be available in cylindrical lengths of indeterminent dimension. For use on the job, an appropriate band width is selected, cut from the continuous roll, and the top and bottom faces are sealed in any well known manner. Thereafter, a pair of valves are provided that communicate with the inner open chamber and the sleeve is then placed over a pipe P as best seen in FIG. 1.

A pair of valves 1 and 2 can assume the following structure as delineated in FIG. 3. The top portion or stem of the valve 1 has a check valve ball 3 which is biased upwardly as by spring 4. Therebelow a passageway 5 communicates with the hollow central portion 7 of the sleeve. A lip assures that ball 3 will remain nested therein, and the spring sits on a shoulder just above the passageway 5 and below the ball 3 so that proper tensioning can be assured. It is therefore apparent, that the central hollow core 7 is suitably adapted to be filled with a material which in the preferred form remains liquid and surrounding this central core is a rubber boundary 6.

The inner and outer walls 8 of the sleeve are provided with peripheral ribs 9 and 11, so that the stepped portion between the ribs serve as cleats to restrict displacement of the seal once it has been placed on a pipe. Once the seal 10 has been thus disposed upon a pipe, the inner chamber 7 is filled with an elastomer such as silicone rubber, or heavy stringy grease through one of the valves. Meanwhile however the second valve is opened by depressing ball 3 so that no air pockets can form within the area 7. When the elastomer or fluid substance begins to come out of the second valve, that valve is closed by providing a pressure gauge thereon. The first valve is continued to remain open pumping additional elastomer in there until an appropriate pressure has been obtained. Typically this pressure may run around 40 to 50 pounds per square inch, but is not limited to that pressure range, since it depends upon specific application for use of this sleeve.

With the fluid which is intended not to set up firmly securely under pressure within the area 7, the ribs 9 and 11 firmly contact the surfaces between the pipe and its surrounding layer C in such a manner that displacement of the seal can not occur. These ribs in the preferred form take the shape of rectangular ridges (as shown in FIG. 2) extending outwardly from a smooth annular surface 8 on the inner and outer faces of the ring or sleeve and as stated before the distance between the face 8 and rib 9 provides a cleat type of action so that shifting of ground, settlement, or vibration is dampened at this stress area.

Figure 7:
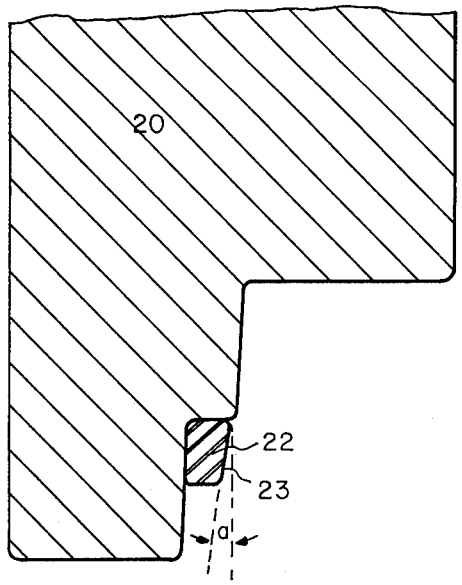
FIG. 7 is a detailed view of an element 20 insertable on opening 20' shown in FIG. 6, the upper righthand corner thereof.
Figure 8:
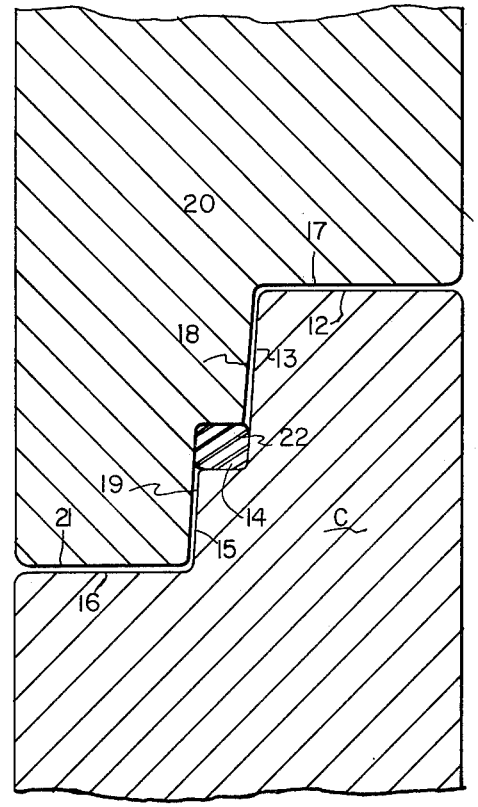
FIG. 8 is an enlarged view of the upper righthand portion of FIG. 6 encircled as "A"

FIGS. 4 and 5 detail a situation in which the pipe is offset relative to the base C, and the sectional view of FIG. 5 shows how the sleeve can deform to accommodate different degrees of offset. FIG. 6 shows an application which is typical for this type of sleeve in which pipes P are caused to enter into a junction area having a base B, openings 20′, and upwardly extending walls C. FIGS. 7 and 8 detail a different structure of the gasket disposed between two elements C and 20 and can be used for joining additional sections also.

As shown in FIG. 7, the gasket 22 in an untensioned state has a wall 23 which is to face the conduit C and is provided with a slope relative to the vertical axis which is necessary to assure that the gasket does not become removed when joining the top portion 20 with the lower portion C. FIG. 8 shows the deformation that the gasket 22 undergoes after joining. In this instance, the downwardly extending tongue of element 20 is provided with a horizontal planar wall 21 which coacts against a correspondingly formed section 16 of C, thereafter the gasket communicates with opposed vertical walls 19 and 15 thereafter vertical walls 18 and 13 of elements 20 and C respectively. A final horizontal step portion 17 and 12 serves to afford an additional surface between these two elements if so desired.

Clearly the amount of pressure on the gasket is governed by the depth of the groove when the tongue of element 20 comes to rest on its supporting face 16. Also clearly evident, a gasket of this nature can be used for extending the vertical dimension of a manhole section pipe or the like with an absolute surity that seepage between the inner faces of these two elements can not occur. The angle of the slope between the vertical axis and the wall 23 typically defines an angle a whose magnitude ranges between 1 degrees and 45 degrees. The angulation of course depends upon the design parameters of the system.

In addition to manhole application, the sleeve can be used in the same manner where a pipe passes through a wall, as a seal and a shock absorber in wells, lift stations etc. and to muffle noises of vibration and pump start and stop that are telegraphed into buildings.

Having thus described the invention, it should be apparent that numerous structural modifications are contemplated as being a part of this invention as described hereinabove and as set forth in the appended claims.

What is claimed is:

1. A sleeve for frictional disposition between a pipe and a surrounding area having an opening through which the pipe passes, said sleeve formed from a roll of heavy rubber having double walled construction and is preferably of cylindrical cross sectional shape wherein said sleeve is cut from the roll to appropriate band width and the cut lines are sealed to provide a hollow central portion between the double walls, said sleeve further including:

ribs on inner and outer annular surfaces of said sleeve for improved retention between the pipe and the surrounding area, first and second valves inserted into said sleeve communicating with said hollow central portion, and a non-hardening fluid material disposed within said central portion through said valves, whereby when said sleeve has been expanded between said pipe and surrounding area, shifting of the pipe relative to the area, vibrations in the pipe and the like are dampened.

2. The device of claim 1 in which said valve means comprises a stem portion having a ball check valve disposed therein, a spring underlying said ball, and a passageway below said spring extending to the hollow area.

3. The device of claim 2 wherein said sleeve is of substantially rectangular cross section when installed.

4. The device of claim 3 wherein said valves force substantially all air from said hollow central portion and said non-hardening fluid material is under pressure.

5. The device of claim 4 in which said fluid material is silicone rubber.

6. The device of claim 4 in which said fluid material is heavy stringy grease.

* * * * *